US012679336B2

(12) United States Patent
Weston et al.

(10) Patent No.: US 12,679,336 B2
(45) Date of Patent: Jul. 14, 2026

(54) SYSTEM AND METHOD FOR SELECTIVE OPERATION OF AN AUTOMATED OFF-ROAD SPEED CONTROL FOR A VEHICLE

(71) Applicant: FORD GLOBAL TECHNOLOGIES, LLC, Dearborn, MI (US)

(72) Inventors: Keith Weston, Canton, MI (US); Matthew Johnson, Toledo, OH (US); Brendan Diamond, Grosse Pointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 245 days.

(21) Appl. No.: 18/231,456

(22) Filed: Aug. 8, 2023

(65) Prior Publication Data

US 2025/0050864 A1 Feb. 13, 2025

(51) Int. Cl.
 *B60W 30/02* (2012.01)
 *B60W 10/06* (2006.01)
 (Continued)

(52) U.S. Cl.
 CPC ............ *B60W 30/02* (2013.01); *B60W 10/06* (2013.01); *B60W 10/08* (2013.01); *B60W 10/184* (2013.01); *B60W 50/082* (2013.01); *B60W 50/12* (2013.01); *B60W 50/14* (2013.01); *B60W 2420/403* (2013.01); *B60W 2520/00* (2013.01); *B60W 2552/00* (2020.02);
 (Continued)

(58) Field of Classification Search
 None
 See application file for complete search history.

(56) References Cited

U.S. PATENT DOCUMENTS 9,849,883 B2 12/2017 Lu et al.
10,486,699 B2 11/2019 Lu et al.
(Continued)

FOREIGN PATENT DOCUMENTS

AU 2021201021 A1 9/2021
BR 102021002634 A2 3/2022
(Continued)

*Primary Examiner* — Peter D Nolan
*Assistant Examiner* — Jacob Kent Besteman-Street
(74) *Attorney, Agent, or Firm* — Burr & Forman; Lorne Forsythe

(57) ABSTRACT

A vehicle control system may include a mode selector for enabling selection of an operating mode of the vehicle among a plurality of selectable operating modes, where at least one of the selectable operating modes includes an off-road driving assistance mode that controls propulsive torque and braking torque application when the off-road driving assistance mode is active. The system may further include a torque control module to generate both a propulsive torque request and a braking torque request based on a target speed set in association with the off-road driving assistance mode, a sensor network operably coupled to components of the vehicle to obtain tractive information associated with an operating context of the vehicle, and a controller operably coupled to the sensor network to receive the tractive information and modify operation of the torque control module responsive to the tractive information indicating a trigger event.

16 Claims, 8 Drawing Sheets

(51) Int. Cl.

| | |
|---|---|
| *B60W 10/08* | (2006.01) |
| *B60W 10/184* | (2012.01) |
| *B60W 50/08* | (2020.01) |
| *B60W 50/12* | (2012.01) |
| *B60W 50/14* | (2020.01) |

(52) U.S. Cl.

CPC ............... *B60W 2710/0666* (2013.01); *B60W 2710/083* (2013.01); *B60W 2710/18* (2013.01)

(56) References Cited

U.S. PATENT DOCUMENTS

| | | | |
|---|---|---|---|
| 11,307,586 B2 | 4/2022 | James | |
| 11,511,744 B2 | 11/2022 | Brewer et al. | |
| 2009/0105921 A1 | 4/2009 | Hanatsuka et al. | |
| 2015/0151747 A1* | 6/2015 | Fairgrieve ........... | B60W 30/045 |
| | | | 701/91 |
| 2015/0203119 A1* | 7/2015 | Bird ................ | B60W 30/18172 |
| | | | 701/90 |

| | | | |
|---|---|---|---|
| 2017/0292850 A1 | 10/2017 | Madapati | |
| 2018/0281797 A1 | 10/2018 | Berels et al. | |
| 2019/0184897 A1* | 6/2019 | Zheng ................... | B60W 50/14 |
| 2019/0187700 A1* | 6/2019 | Zheng ............. | B60W 60/0059 |
| 2020/0317194 A1 | 10/2020 | Yan et al. | |
| 2021/0173399 A1 | 6/2021 | Richard et al. | |
| 2022/0194360 A1* | 6/2022 | Weston ................ | B60W 30/02 |
| 2023/0398991 A1* | 12/2023 | Chiba ................ | B60W 30/182 |
| 2024/0001932 A1* | 1/2024 | Birch ............. | B60W 30/18172 |
| 2025/0162594 A1* | 5/2025 | Ansari ............... | B60W 40/068 |

FOREIGN PATENT DOCUMENTS

| | | | |
|---|---|---|---|
| CN | 107367284 A | 11/2017 |
| DE | 102019114609 A1 | 12/2019 |
| GB | 2563316 A | 12/2018 |
| JP | 09175225 A | 7/1997 |
| KR | 101676177 B1 | 11/2016 |
| WO | 2021079003 A1 | 4/2021 |

* cited by examiner

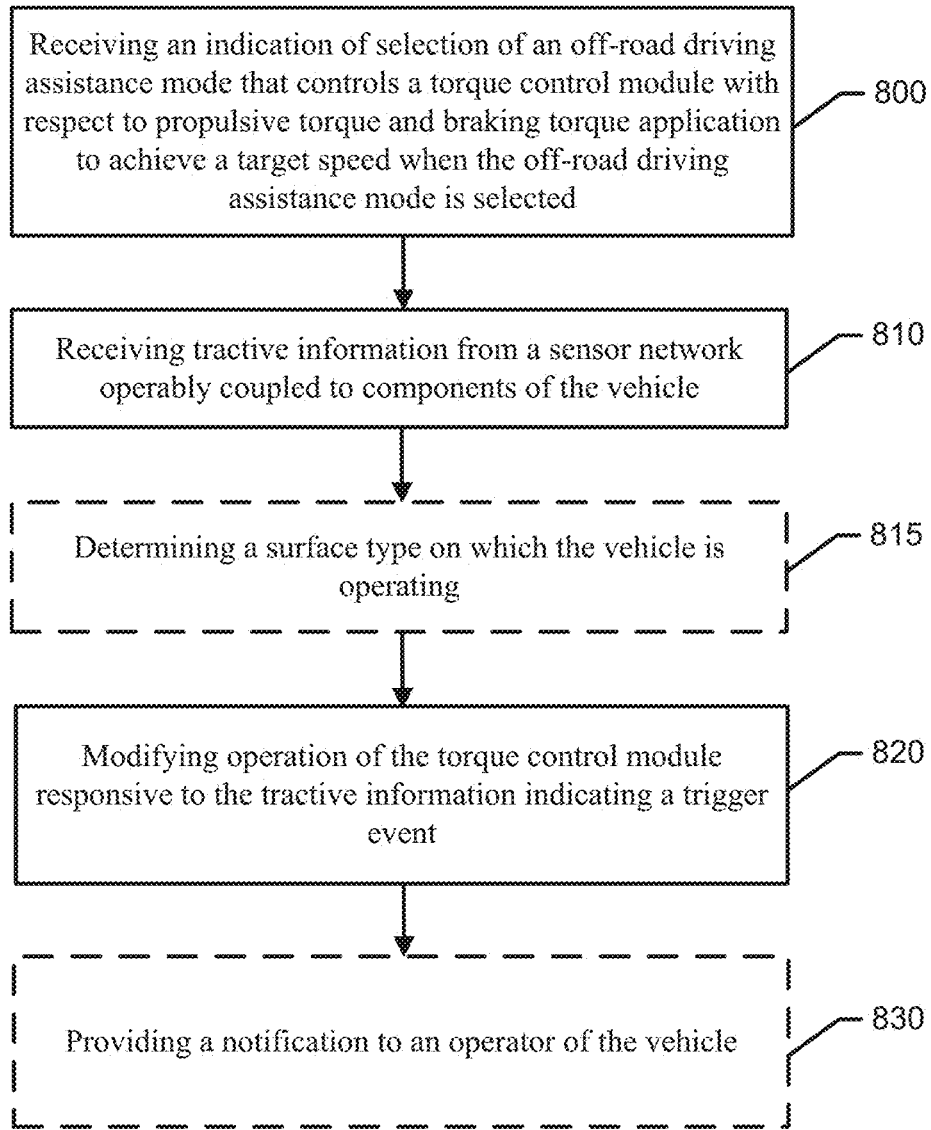

Receiving an indication of selection of an off-road driving assistance mode that controls a torque control module with respect to propulsive torque and braking torque application to achieve a target speed when the off-road driving assistance mode is selected — 800

Receiving tractive information from a sensor network operably coupled to components of the vehicle — 810

Determining a surface type on which the vehicle is operating — 815

Modifying operation of the torque control module responsive to the tractive information indicating a trigger event — 820

Providing a notification to an operator of the vehicle — 830

FIG. 8

SYSTEM AND METHOD FOR SELECTIVE OPERATION OF AN AUTOMATED OFF-ROAD SPEED CONTROL FOR A VEHICLE

TECHNICAL FIELD

Example embodiments generally relate to vehicle control algorithms and, more particularly, relate to a system and method for providing an off-road driver assistance feature for speed control and for selectively operating such feature based on knowledge of an operating surface.

BACKGROUND

Navigating off-road terrain, or rugged trails, can often require coordinated application of both propulsive and braking torque, while simultaneously also steering the vehicle. Traditionally, drivers control wheel speeds under such circumstances by modulating the throttle and brake pedals simultaneously, while also steering the vehicle, which can be difficult to manage for even experienced drivers. To mitigate this difficulty, a "trail control" feature that manages the application of propulsive and braking torque so the operator can manage only the steering has been introduced. However, there may be times when the surface on which the vehicle is operating may not be well suited for programmatic propulsive and braking torque control of this nature.

Thus, it may be desirable to develop a driver assistance feature that can be used to automate controlling speed during off-road driving situations, but apply a level of discrimination based on surface type with respect to enablement of such feature, for a more satisfying user experience.

BRIEF SUMMARY OF SOME EXAMPLES

In accordance with an example embodiment, a vehicle control system for a vehicle may be provided. The system may include a mode selector for enabling selection of an operating mode of the vehicle among a plurality of selectable operating modes, where at least one of the selectable operating modes includes an off-road driving assistance mode that controls propulsive torque and braking torque application when the off-road driving assistance mode is active. The system may further include a torque control module to generate both a propulsive torque request and a braking torque request based on a target speed set in association with the off-road driving assistance mode, a sensor network operably coupled to components of the vehicle to obtain tractive information associated with an operating context of the vehicle, and a controller operably coupled to the sensor network to receive the tractive information and modify operation of the torque control module responsive to the tractive information indicating a trigger event.

In another example embodiment, a method of providing automated control of an off-road driver assist mode may be provided. The method may include receiving an indication of selection of an off-road driving assistance mode that controls a torque control module with respect to propulsive torque and braking torque application to achieve a target speed when the off-road driving assistance mode is selected, receiving tractive information from a sensor network operably coupled to components of the vehicle, and modifying operation of the torque control module responsive to the tractive information indicating a trigger event.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 8 illustrates a method of controlling an operational mode of a vehicle in accordance with an example embodiment.

DETAILED DESCRIPTION

Figure 1:
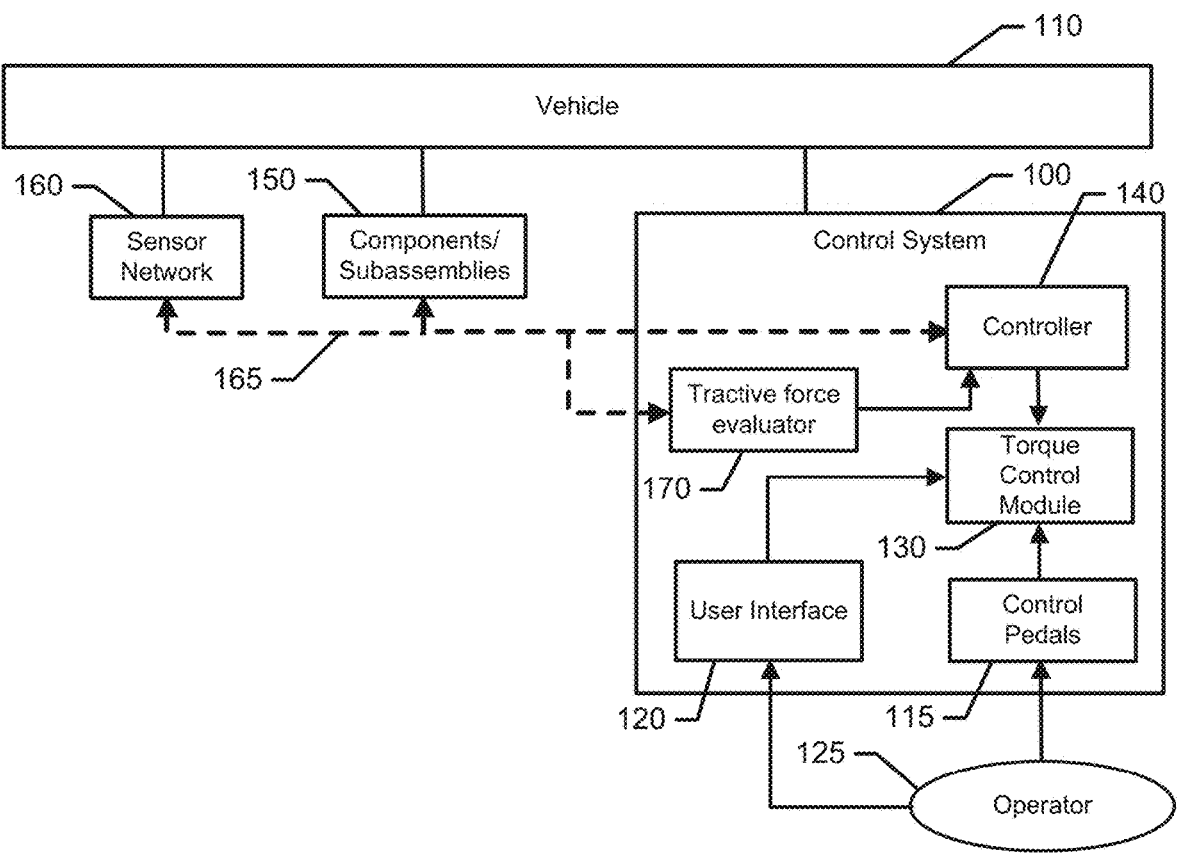
FIG. 1 illustrates a block diagram of a vehicle control system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As noted above, off-road driving may sometimes include two-pedal driving, or at least driving on terrain with various different surface types or even obstacles that may present certain challenges. For example, one challenge posed by this operational context may be the need to quickly transition from the significant propulsive force required for a drive wheel to overcome or climb to the apex of an obstacle to the significant brake torque required to prevent overshooting the driver's intended wheel positions after the vehicle as passed the apex and is on the descending side of the obstacle. Another challenge posed by this operational context is the balancing of brake and propulsive torques while propelling the vehicle from a standstill position on a large grade, or on the ascending side of a significant obstacle. Even bypassing of obstacles by steering to keep away from them adds its own challenges. Thus, a feature that can manage propulsion and braking at low speeds in off-road conditions (e.g., trail control) may be desirable to enable a smooth forward vehicle motion while minimizing backward motion to enable the driver to handle the steering aspect of the experience.

Whereas an operator may directly control the brake and propulsive torques through operation of the speed control and brake pedals normally, giving operators the option to automate some of the functions associated with vehicle control in this context has been a popular choice. A familiar automated speed control function is commonly referred to as "cruise control" whereas its analog in the off-road context may be referred to as "trail control." Generally speaking, cruise control allows the operator to set a target speed (or set point), and then measures current speed to determine an error value by comparing the current and target speeds. The automated speed control function then closes the error value to zero in a continuous feedback loop in order to maintain vehicle speed as close as possible to the target speed. However, within this context, it is known that vehicle load (and perhaps other correction factors) must be considered in order to prevent significant overshoots or undershoots that degrade from the user experience. For example, while climbing a steep grade, increased torque will be added due to the growing error value as the grade increases.

Whereas cruise control typically controls only propulsive torque, and off-road driving situations require a combination of propulsive and braking torque to ensure that roll-back is prevented (e.g., if the vehicle is unable to climb over an obstacle), and that the overall experience is optimized. To address this situation, many vehicle manufacturers have provided vehicle control systems capable of operating in off-road operational contexts by automating certain aspects of vehicle control. However, even these vehicle control systems, which are designed to control both propulsive and braking torque for off-road driving, may face particular challenges that remain difficult to overcome. For example, if the vehicle has a target speed set while trail control is enabled and encounters a change in surface type to highly malleable surface (e.g., sand), the set speed may be used to drive wheel speed, but the wheels may lose traction and begin to dig in the malleable surface. Forward motion of the vehicle may slow while the vehicle begins to dig, and in some cases, the vehicle may dig to the point of being stuck. Meanwhile, a driver controlling speed may have noticed the reduction in forward motion and may have backed up to take another attempt at traversing the malleable surface without digging or getting stuck.

Accordingly, whereas the trail control feature is valued and enjoyed in most situations, the value and enjoyment could be enhanced if the feature was further controllable to prevent situations where the system might actually contribute to a vehicle to becoming stuck. Example embodiments provide the ability to assess the current surface type and determine whether to disable the trail control feature, augment its normal response, or otherwise alert the driver to take (or consider taking) action to manually control propulsive and braking torque application. Some example embodiments may therefore provide a control system that allows the driver to select automated speed control for off-road driving conditions, but evaluate the driving surface in order to enhance performance in the most challenging of situations that are likely to be encountered by disabling or augmenting the automated speed control when doing so may be advantageous. As such, some example embodiments may provide a more intelligent and capable system for vehicle control that can yield benefits in both customer confidence and vehicle capability. As a result, vehicle performance and driver satisfaction may also be enhanced.

FIG. 1 illustrates a block diagram of a control system 100 of an example embodiment. The components of the control system 100 may be incorporated into a vehicle 110 (e.g., via being operably coupled to a chassis of the vehicle 110, various components of the vehicle 110 and/or electronic control systems of the vehicle 110). Of note, although the components of FIG. 1 may be operably coupled to the vehicle 110, it should be appreciated that such connection may be either direct or indirect. Moreover, some of the components of the control system 100 may be connected to the vehicle 110 via intermediate connections to other components either of the chassis or of other electronic and/or mechanical systems or components.

The control system 100 may have a normal mode of operation that includes an input device in the form of control pedals 115. The control pedals 115 may include a brake pedal and a speed control pedal (e.g., throttle or gas pedal) pivotally mounted to the floor of the vehicle 110, and operable by an operator 125. The brake pedal may generally be used to provide inputs for control of braking torque, and the speed control pedal may be used to provide inputs for control of propulsive torque. However, the normal mode of operation may not be desirable for all cases. Moreover, selectable other modes of operation, including one or more off-road driver assistance modes may also exist. Accordingly, the control system 100 of some example embodiments may further include a user interface 120. The operator 125 may operate the user interface 120, which may include or define a mode selector to shift out of the normal mode of operation and into any of the other modes of operation. In one example embodiment, the other modes of operation that can be selected by the operator 125 via the user interface 120 may include an off-road driver assistance mode. Of note, although the term off-road driver assistance mode will generally be referred to herein as being the mode in which example embodiments are performed, the name of the mode in which example embodiments may be applied is not important, and certainly not limiting. Other terms like trail control mode, or any other descriptive terms for a mode in which the functionality described herein is applied, are also possible.

In the off-road driver assistance mode, the control pedals 115 may not be the primary source of input for controlling operation of the vehicle 110 with respect to torque control. The control pedals 115 may either be disabled or may be enabled to provide additive input relative to automatic control that may be initiated by a torque control module 130 of the control system 100 as described in greater detail below.

Accordingly, the control system 100 of example embodiments may also include the torque control module 130, which may be part of or otherwise operably coupled to a controller 140. The torque control module 130 may be configured to determine net torque as described herein based on inputs from any or all of the controller 140, the user interface 120 or other components of the vehicle 110. In some cases, the controller 140 may be part of an electronic control system of the vehicle 110 that is configured to perform other tasks related or not related to propulsive and braking control or performance management. However, the controller 140 could be a dedicated or standalone controller in some cases.

In an example embodiment, the controller 140 may receive information that is used to determine vehicle status from various components or subassemblies 150 of the vehicle 110. Additionally or alternatively, various sensors that may be operably coupled to the components or subassemblies 150 may be included, and may provide input to the controller 140 that is used in determining vehicle status. Such sensors may be part of a sensor network 160 and sensors of the sensor network 160 may be operably coupled to the controller 140 (and/or the components or subassemblies 150) via a vehicle communication bus (e.g., a controller area network (CAN) bus) 165.

The components or subassemblies 150 may include, for example, a brake assembly, a propulsion system and/or a wheel assembly of the vehicle 110. The brake assembly may be configured to provide braking inputs to braking components of the vehicle 110 (e.g., friction brakes and electrical methods of braking such as regenerative braking) based on a braking torque determined by the controller 140 and/or torque control module 130. The propulsion system may include a gas engine, electric motor, or any other suitable propulsion device. The controller 140 and/or torque control module 130 may be configured to determine propulsive torque inputs for provision to the propulsion system to apply propulsive torque to the wheels of the wheel assembly of the vehicle 110. Moreover, one or more corresponding sensors of the sensor network 160 that may be operably coupled to the brake assembly and/or the wheel assembly may provide information relating to brake torque, brake torque rate, vehicle velocity, vehicle rate of change of speed, front/rear wheel speeds, vehicle pitch, etc. Other examples of the components or subassemblies 150 and/or corresponding sensors of the sensor network 160 may provide information relating to yaw, lateral G force, throttle position, selector button positions associated with chassis and/or vehicle control selections, etc.

Accordingly, for example, the controller 140 may be able to receive numerous different parameters, indications and other information that may be related to or indicative of different situations or conditions associated with vehicle status. The controller 140 may also receive information indicative of the intent of the operator 125 relative to control of various aspects of operation of the vehicle 110 and then be configured to use the information received in association with the execution of one or more control algorithms that may be used to provide instructions to the torque control module 130 in order to control application of net torque to the wheels of the wheel assembly of the vehicle 110.

In an example embodiment, the operator 125 may use the user interface 120 to select the off-road driver assistance mode and define a target speed at which the vehicle 110 should operate for off-road driving under automated speed control. Such selection may correspondingly activate the torque control module 130 to provide the automated speed (and/or torque) control based on information provided by the components or subassemblies 150 and/or corresponding sensors of the sensor network 160. The automated speed/torque control may be accomplished based on the error measured between the current speed and the target speed by applying propulsive and braking torque requests that aim to reach and maintain the target speed. However, example embodiments may further employ a tractive force evaluator 170 that enables a determination of tractive information regarding the surface upon which the vehicle 110 is operating (or specific tires or wheels are traversing). The tractive force evaluator 170 (which may operate under control of the controller 140 in some cases or be a module of the control system 100) may be operably coupled to the sensor network 160 to receive various inputs from sensors thereof, and may determine the tractive information based on the inputs. The tractive information may include information regarding the type of surface being traversed (e.g., sand, dirt, pavement, rock, gravel, etc.) and its condition (e.g., muddy, dry, frozen, soft, hard, loose, firm, etc.) Operation of the tractive force evaluator 170 in connection with the torque control module 130 will be described in greater detail below in reference to FIG. 2.

When the torque control module 130 is active, and automated controls thereof have been selected, the automated control may, in some cases, depend on (or modify) the driveline state of the vehicle 110. In this regard, the driveline may include front and rear axles, drive components for the front and rear axles and/or the components that provide coupling therebetween. Thus, for example, the driveline may include electric motors, gears and/or clutch components that operably couple the front and rear axles (and/or their driving components) to execute front wheel, rear wheel, four wheel, or all-wheel drive conditions whether in an ICE or BEV context. Some modifications described herein may depend on the current driveline state, or may change the driveline state, as described in greater detail below.

Figure 2:
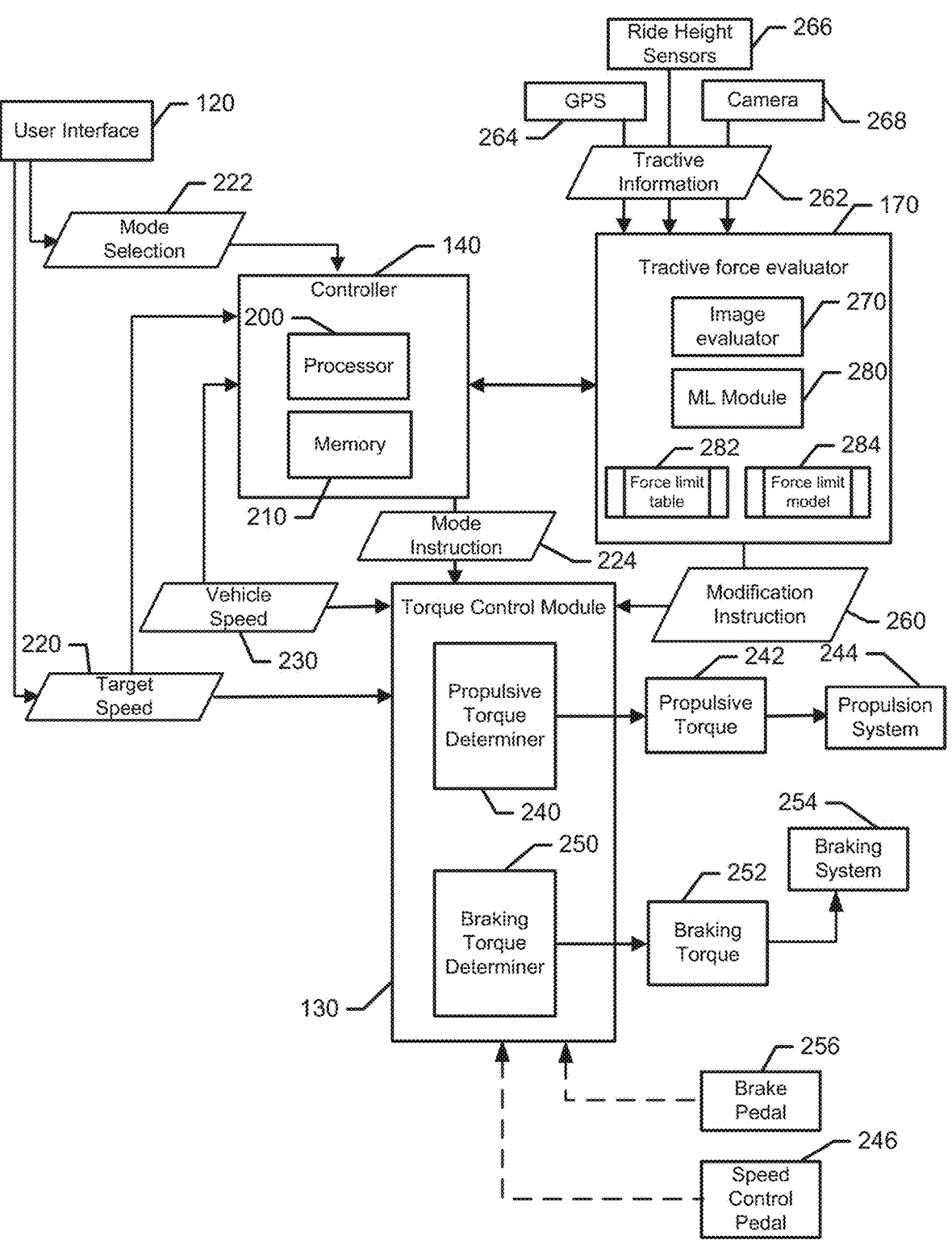
FIG. 2 illustrates a block diagram of some components of the vehicle control system of FIG. 1 in accordance with an example embodiment.

Referring now to FIG. 2, operation of the controller 140 and the torque control module 130 will be described in greater detail. FIG. 2 illustrates a block diagram of various components of the control system 100 in greater detail. In this regard, for example, FIG. 2 illustrates example interactions between the controller 140 and the torque control module 130 relative to information received thereby (e.g., from the sensor network 160, from various ones of the components/subassemblies 150, and/or from the user interface 120). Processing circuitry (e.g., a processor 200 and memory 210) at the controller 140 may process the information received by running one or more control algorithms. The control algorithms may include instructions that can be stored by the memory 210 for retrieval and execution by the processor 200. In some cases, the memory 210 may further store one or more models and/or tables (e.g., look up tables) and various calculations and/or applications may be executed using information in the models or tables and/or the information as described herein.

The processor 200 may be configured to execute the control algorithms in series or in parallel. However, in an example embodiment, the processor 200 may be configured to execute multiple control algorithms in parallel (e.g., simultaneously) and substantially in real time. The control algorithms may be configured to perform various calculations based on the information received/generated regarding specific conditions of vehicle components. The control algorithms may therefore execute various functions based on the information received, and generate outputs to drive the control of net torque applied at the wheels of the vehicle 110. The torque control module 130 may itself be a control algorithm, or may include control algorithms in the form of functional modules (or sub-modules) configured to perform specific functions for which they are configured relating to control of the vehicle 110 in the manner described herein. Similarly, the tractive force evaluator 170 may be a control algorithm, or may include a control algorithm in the form of a module or sub-module of the controller 140 configured to perform specific functions for which it is configured relating to determining tractive force capacity of ground on which the vehicle 110 is operating, and introducing responses thereto, as described herein. Thus, for example, the controller 140 may actually function as the torque control module 130 and/or the tractive force evaluator 170 responsive to executing the control algorithms. However, in other cases, the torque control module 130 and/or the tractive force evaluator 170 may be a component or module of the controller 140, or an entirely separate component (e.g., each possibly also including its own corresponding processing circuitry).

In an example embodiment, the information upon which the control algorithms operate may include a target speed 220. In this regard, the target speed 220 may be selected by the operator 125 via the user interface 120 of FIG. 1. Moreover, the user interface 120 may include or otherwise act as a mode selector to enable a mode selection 222 to be made and communicated to the controller 140 to inform the controller 140 of the selected operating mode of the vehicle 110. The selected operating mode may be any of a plurality of operating modes (e.g., autonomous, normal, trail control (or off-road driver assistance), sport, parking assist, towing, etc.). The mode selection 222 may then be provided to the torque control module 130 in the form of a mode instruction 224 to inform the torque control module 130 with respect to specifically which models or algorithms to execute for the selected operating mode. The information upon which control algorithms operate may also include vehicle speed 230. Vehicle speed 230 may be provided from a speedometer of the vehicle 110, from global positioning system (GPS) information, or any other suitable source including detectors capable of measuring wheel speed for each individual one of the wheels of the vehicle 110.

In an example embodiment, the torque control module 130 may be configured to include a propulsive torque determiner 240. In general, the propulsive torque determiner 240 may be configured to receive information in order to determine a propulsive torque 242 to be applied to a propulsion system 244 of the vehicle 110 (e.g., a gasoline engine, electric motor, and/or the like). In other words, propulsive torque 242 may be considered to be representative of a propulsive torque request, or a request for a corresponding determined amount of propulsive torque. When in the normal mode of operation, the information used to determine propulsive torque 242 may include a speed control input provided by a speed control pedal 246 (e.g., a throttle or gas pedal). When in the off-road driver assistance mode, the information used to determine the propulsive torque 242 may include target speed 220 and vehicle speed 230.

In an example embodiment, the torque control module 130 may also be configured to include a braking torque determiner 250. In general, the braking torque determiner 250 may be configured to receive information (e.g., including the target speed 220 and the vehicle speed 230) in order to determine a braking torque 252 to be applied to a braking system 254 of the vehicle 110. In other words, the braking torque 252 may be considered to be representative of a braking torque request, or a request for a corresponding determined amount of braking torque. When in the normal mode of operation, the information used to determine braking torque 252 may include a braking input provided by a brake pedal 256. When in the off-road driver assistance mode, the information used to determine the braking torque 252 may include target speed 220 and vehicle speed 230. However, even in the off-road driver assistance mode, if the operator inserts a braking input via the brake pedal 256, such input may also be considered with respect to determining the braking torque 252.

In an example embodiment, the controller 140 (and/or the torque control module 130) may be configured to determine an error or difference value based on comparing the vehicle speed 230 to the target speed 220 (e.g., in the off-road driver assistance mode). The controller 140 (and/or the torque control module 130) may control the application of the propulsive torque 242 to the propulsion system 244 and the braking torque 252 to the braking system 254 based on the error signal. However, this simple control system may cause issues when transitions are made to softer or more malleable surfaces, as noted above. Accordingly, the controller 140 (and/or the torque control module 130) may be configured as a PID (proportional-integral-derivative) controller that is further configured to determine tractive force limitations for a given operating surface via the tractive force evaluator 170. The tractive force evaluator 170 may not only determine such limitations, but further provide a modification instruction 260 to the torque control module 130 (and/or controller 140) that may modify the control algorithm executed by the torque control module 130 relative to the normal calculations that are made for corresponding propulsive torque 242 or braking torque 252 calculations.

Accordingly, for example, the propulsive torque determiner 240 and/or the braking torque determiner 250 may be configured to determine the propulsive torque 242 and/or the braking torque 252, respectively, via error calculations that are modified based on the modification instruction 260. Additionally or alternatively, a propulsive torque map or a braking torque map may be constructed and used (either by the torque control module 130 or the tractive force evaluator 170) to determine how to limit or modify the torque requests otherwise normally determined by the torque control module 130 based on the terrain on which the vehicle 110 is operating. In an example embodiment, such maps may define nominal values of error and provide corresponding torque values to be used for adjustment based on the modification instruction 260 (and/or other information or variables that may be provided by the sensor network 160 and/or various ones of the components/subassemblies 150).

In an example embodiment, the modification instruction 260 may be generated by the tractive force evaluator 170 based on tractive information 262 that may be determined, obtained or received from various sensors of the sensor network 160. In an example embodiment, the tractive information 262 may be provided by any or all of GPS 264, ride height sensors 266 and a camera 268. These inputs may be used to provide the tractive information 262, which may provide an assessment of either the nature of the ground or surface on which the vehicle 110 (or its wheels) is currently operating or of the results being determined from operating on the ground or surface. In some embodiments, the tractive force evaluator 170 may therefore perform at least two functions including first, trying to determine the type of surface on which the vehicle 110 is operating so that corresponding force limits can be determined (and respected) for the determined type of surface. The second function may be to determine when it seems that the vehicle 110 is being negatively affected by tractive information so that further corrective action may be taken.

When GPS 264 is employed, the speed over ground of the vehicle 110 may be determined. The speed over ground may be indicative of the actual motion of the vehicle 110 and not merely an assumed speed that may otherwise be apparent based on the vehicle speed 230 if the vehicle speed 230 is actually determined based on wheel speeds. Thus, for example, when vehicle speed 230 is determined based on wheel speed, as noted above, the wheel speed may indicate that the vehicle 110 should be moving forward even though the vehicle 110 has instead encountered a soft patch of ground and is slowing down while digging into the soft patch of ground. The use of GPS 264 to obtain actual speed over ground may therefore ensure that an understanding of the situation is properly established. Moreover, the proper understanding that is established indicates when the vehicle 110 is actually not moving forward either at all or at least at the speed one might expect based on the wheel speed. To the extent there is a difference between wheel speed based estimates of the vehicle speed 230 and the actual speed over ground indicated by the GPS 264, the difference may be caused by slippage due to the wheels having a low traction on the surface on which the wheels are presently turning. GPS 264 may also enable some determination regarding the surface on which the vehicle 110 is operating. Thus, GPS 264 may play a role in either or both of the two functions noted above, and the tractive information 262 provided by the GPS 264 may include geography-based information regarding surface type and/or speed over ground. In some embodiments, the vehicle speed 230 or any other speed value considered with respect to the controls provided herein may be modified or determined at least in part based on various other factors such as surface type, wheel speed minus vehicle speed over ground, or the like, and such other factors may be considered via the application of a lookup table (or tables) or other weighting factor or modification function.

The ride height sensors 266 may generally not be useful for determining the type of surface on which the vehicle 110 is operating. However, the ride height sensors 266 may be useful for determining the effects of operating on the surface determined by other means. In this regard, for example, the ride height sensors 266 may be used to determine when the vehicle 110 is going into a droop condition. Knowing that the vehicle 110 is going into a droop condition can indicate that the vehicle 110 is heading toward (if unchecked) a full droop condition where the wheels have dug down to the point at which the chassis is actually resting on the surface and the vehicle 110 is stuck. Thus, by knowing that the vehicle 110 is starting to droop, the tractive force evaluator 170 may be enabled to provide the modification instruction 260 to alert the operator 125 to take action, to limit tractive force to stop continued digging, or to provide control instructions to take another attempt to traverse the place that is currently causing the vehicle 110 to dig. Moreover, the vehicle 110 could be stopped in some cases (when it is noticed that digging is happening) and then wheel speeds may be controlled (e.g., increased) by a fixed amount for a given (operator 125 set) speed in order to attempt to better maintain speed over ground for another attempt at the surface or obstacle. Alternatively or additionally, if speed over ground is decreasing (as indicated by GPS 264) with constant wheel speeds and droop is detected (based on ride height sensor 266 input), wheel speed targets may be increased in order to maintain a constant speed over ground during another attempt. Thus, the tractive information 262 provided by the ride height sensors 266 may be ride height information and/or corresponding suspension information (such as when the vehicle 110 is entering into a droop condition). Lidar or radar may serve as substitutes for (or additions to) the ride height sensors 266 for determining droop conditions or other ride height information.

The camera 268 may be one of potentially multiple cameras that may be used in connection with the first function noted above (i.e., determining the surface type on which the vehicle 110 is operating). Thus, for example, the camera 268 may obtain direct image data of the surface itself proximate to one or more of the wheels of the vehicle 110, and the image data may be analyzed by the tractive force evaluator 170. In some embodiments, the tractive force evaluator 170 may include an image evaluator 270. The camera 268 may therefore provide the image data to the image evaluator 270, and the image evaluator 270 may determine the type of surface on which the vehicle 110 is operating from the image data. Moreover, in some cases, the image evaluator 270 may further be configured to measure or otherwise determine from tire tread patterns, information regarding a condition of the surface (wet, slippery, frozen, dry, etc.). Thus, the image data may not only be used to determine whether the surface is asphalt, sand, dirt, gravel, rock, etc., but further be enabled to determine whether the surface is wet sand or dry sand, mud, ice, snow, and/or the like. The tractive information 262 provided by the camera 268 may therefore include image data and, in some cases, specifically image data including tire tread patterns. The depth of ruts, shape, or various other aspects of the tire tread pattern may provide useful information about surface type and condition that may be used, in some cases, to determine tractive force limits that are associated with the corresponding surface type and/or condition.

Beyond simply obtaining image data, however, the camera 268 may also be used in determining ride height information. In this regard, distance to the ground may also be determined by some cameras, or lidar/radar sensors that may be used with or as an alternative to cameras. A level of deformation of the surface along with a level of depression into the surface may therefore be used independently or in combination using the camera 268 (with or without other sensors) to enable the tractive information 262 to be useful with respect to operation of the image evaluator 270 specifically, or the tractive force evaluator 170 more generally. The camera 268 may be an underbody camera, a rear camera, side camera, B-pillar camera, or any other type of vehicle camera that may gather image data or other measurement information (e.g., including lidar, radar, or other augmentation).

In some embodiments, the tractive force evaluator 170 may use information regarding the surface type and/or condition in order to further determine a tractive force limit for the corresponding surface type and/or condition. For example, the tractive force limit may be a force threshold above which tire slip may become likely (if not expected), and below which tire slip is less likely (if not unlikely). By defining the tractive force limit, the tractive force evaluator 170 may effectively determine the maximum force that should be applied (by the torque control module 130 in order to prevent digging into the surface (and therefore potentially getting stuck). The tractive force limit may be stored in tables, or determined based on one or more models. In such cases, fixed tables and/or models may be used to enter the table or model with the tractive information 262 and provide a corresponding output value of tractive force or torque that defines an upper limit that is to be communicated to the torque control module 130 via the modification instruction 260. However, in some embodiments, the tables or models may not necessarily be fixed, and may instead be modified via machine learning over time.

Accordingly, for example, a machine-learning (ML) module 280 may be provided in some embodiments. The machine-learning module 280 may employ one or more models or tables that can be modified over time using machine learning. The machine-learning module 280 may be convolutional neural network (or other neural network) or a regression based learning algorithm. Force limit table 282 is one example (of potentially multiple instances) of a table of corresponding force limits that are defined for respective input tractive information 262. Force limit model 284 is also one example (of potentially multiple instances) of a model for determining corresponding force limits that are defined for respective input tractive information 262. In some cases, one model or table may be defined for and/or apply to each respective different surface type and/or condition, and the corresponding model or table may determine a maximum tractive force that can be realized for each surface type/condition for a given vehicle or vehicle configuration (e.g., driveline status). The models or tables may further include or consider factors determinable from sensors of the sensor network 160 including such information as tire pressure, tire width, ambient temperature, weight, weight distribution, etc.

Whether directly from tables/models or by further incorporating machine learning with updateable models and tables, the tractive force evaluator 170 may therefore define a tractive force limit that is communicated as the modification instruction 260 to the torque control module 130. The modification instruction 260 in these examples may therefore define a maximum wheel torque for the corresponding surface. In some cases, the maximum wheel torque may further be speed dependent, and therefore may change slightly with respective different vehicle speed 230 values, target speed 220, and/or the like. Thus, the modification instruction 260 may be a value used to truncate or limit wheel torque. However, in other cases, the modification instruction 260 may be used to stop the vehicle 110 and exit the off-road driver assistance mode (e.g., exit trail control). In such cases, the operator 125 may receive an indication (e.g., via the user interface 120) that the off-road driver assistance mode has been deactivated or otherwise exited, and may be provided with information descriptive of the reason for the change, and perhaps also instructions to assist in dealing with the current situation.

In some embodiments, whenever the vehicle 110 makes a change due to action from the tractive force evaluator 170, notes may not only be made internal to the vehicle 110 (e.g., for updated learning by the machine-learning module 280), but may also be shared with other vehicles either via vehicle-to-vehicle (V2V) communication or via uploading to a cloud or other central server resource that may share such information with other vehicles. By this means, problem areas may be identified and either steered clear of altogether or at least attempted to be traversed with increased knowledge of expected challenges, and perhaps also with the strategies to approach such regions for successful traversal. Different strategies may therefore be defined for different surfaces and/or vehicle states. Thus, for example, for traversing rock, maintaining a level of wheel spin may be common for identifying a tractive surface, and it may be best not to terminate the off-road driver assistance function but instead maintain a constant low wheel speed in an attempt to find traction at a given wheel speed. However, for other surfaces and conditions, it may be best to terminate the off-road driver assistance function, inform the operator 125 and have the operator 125 take manual control. Wheel speed targets may be defined including comparing powertrain torque estimates with measured longitudinal rate of change of speed, estimated vehicle mass, grade, tire diameter, etc., in order to determine how deformable a given surface is. Thus, for example, at a slow and steady speed over ground, if the powertrain torque is high, the vehicle may be pushing a lot of material out of the way to maintain forward momentum versus the same situation with a low powertrain torque, which would indicate a much less deformable surface. As such, it may be possible to estimate the drag associated with a given situation based on comparing torque to speed over ground.

Figure 3:
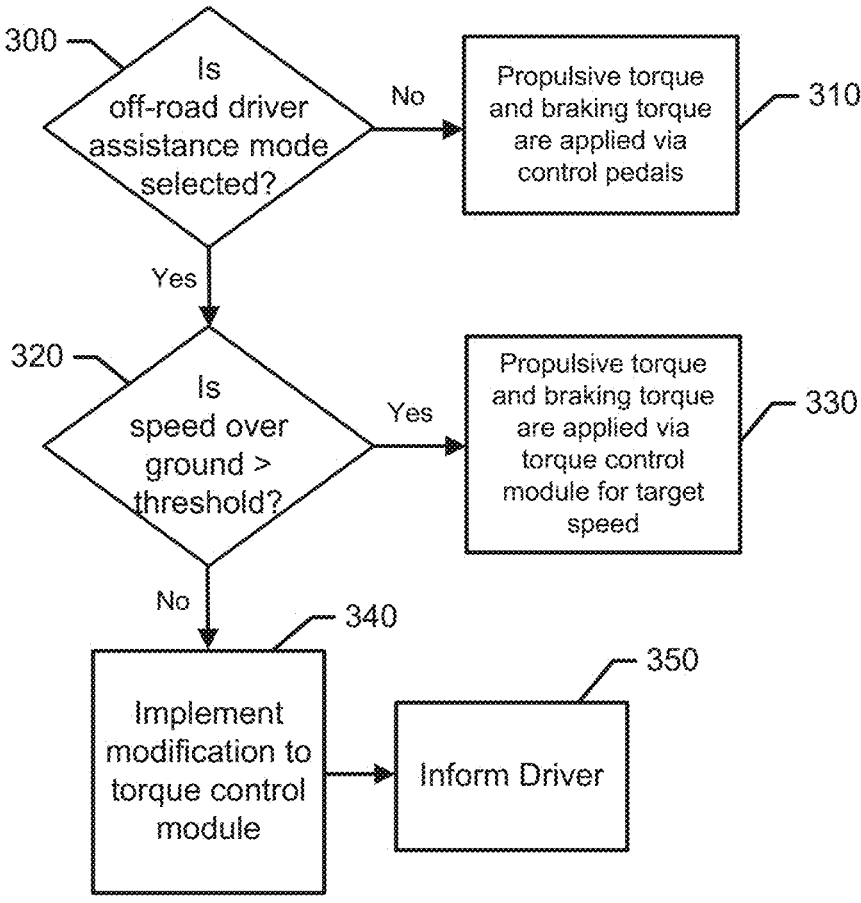
FIG. 3 illustrates a block diagram of a control algorithm for providing automated control of an off-road driver assistance mode in accordance with an example embodiment.

FIG. 3 illustrates a block diagram of operation of a control algorithm of an example embodiment. In this regard, at operation 300, a determination may be made as to whether the off-road driver assistance mode is selected. If not, propulsive torque and braking torque may be applied normally via control pedals at operation 310. However, if the off-road driver assistance mode is selected, then a determination regarding vehicle speed (e.g., speed over ground) may be made at operation 320 to determine whether such speed is above a threshold. If speed is indeed above the threshold, then the off-road driver assistance mode may be operating as expected and propulsive torque and braking torque may be applied via the torque control module 130 to achieve the target speed 220 at operation 330. However, if speed is slowing to below the threshold speed, then a modification to the torque control module (e.g., the modification instruction 260) may be implemented at operation 340, and in some cases the driver may also be informed at operation 350.

Figure 4:
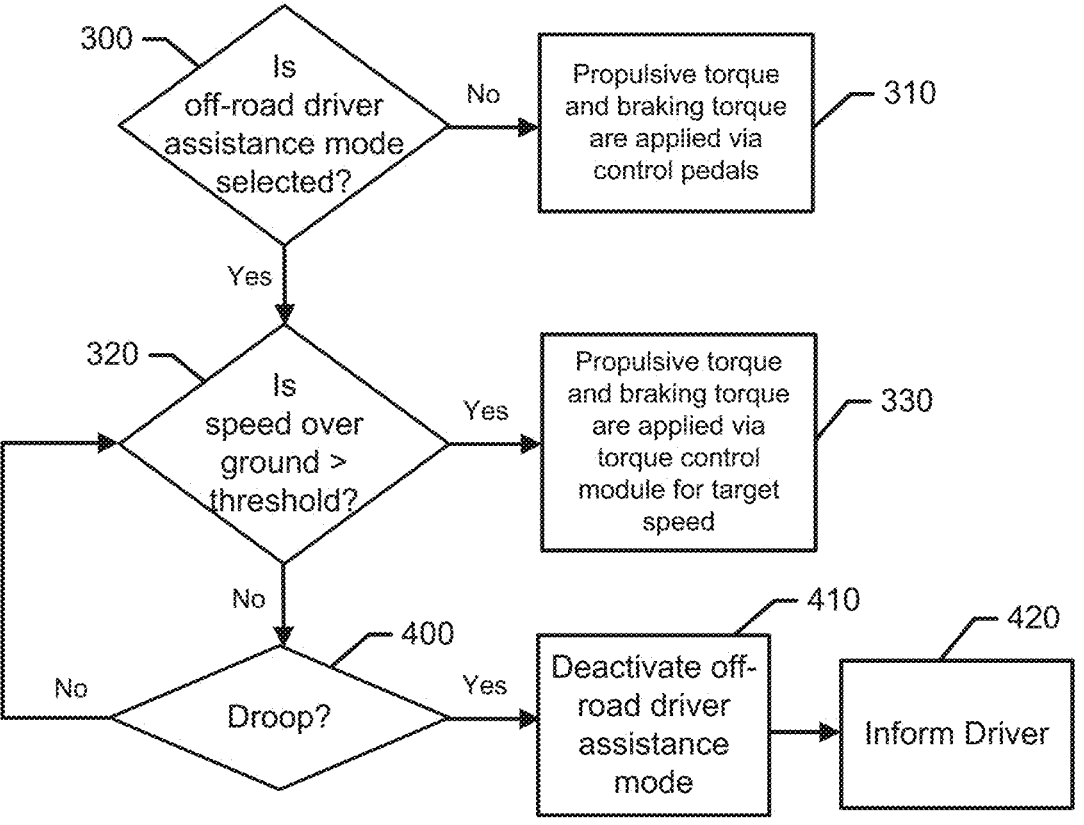
FIG. 4 illustrates a modified example of the control algorithm of FIG. 3 in accordance with an example embodiment.

As noted above, the modification instruction 260 may itself take different forms and have different goals. FIG. 4 effectively illustrates one such particular form. However, at least for this example, operations 300 to 330 may be the same as for FIG. 3. Yet, for this example, if speed is slowing to below the threshold speed at operation 320, then a determination may be made as to whether droop is detected at operation 400. If there is no droop, then flow may loop back to operation 320. However, if droop is detected at operation 400, then the vehicle may be digging into the surface and the off-road driver assistance mode may be turned off at operation 410, and the driver may be informed at operation 420.

Figure 5:
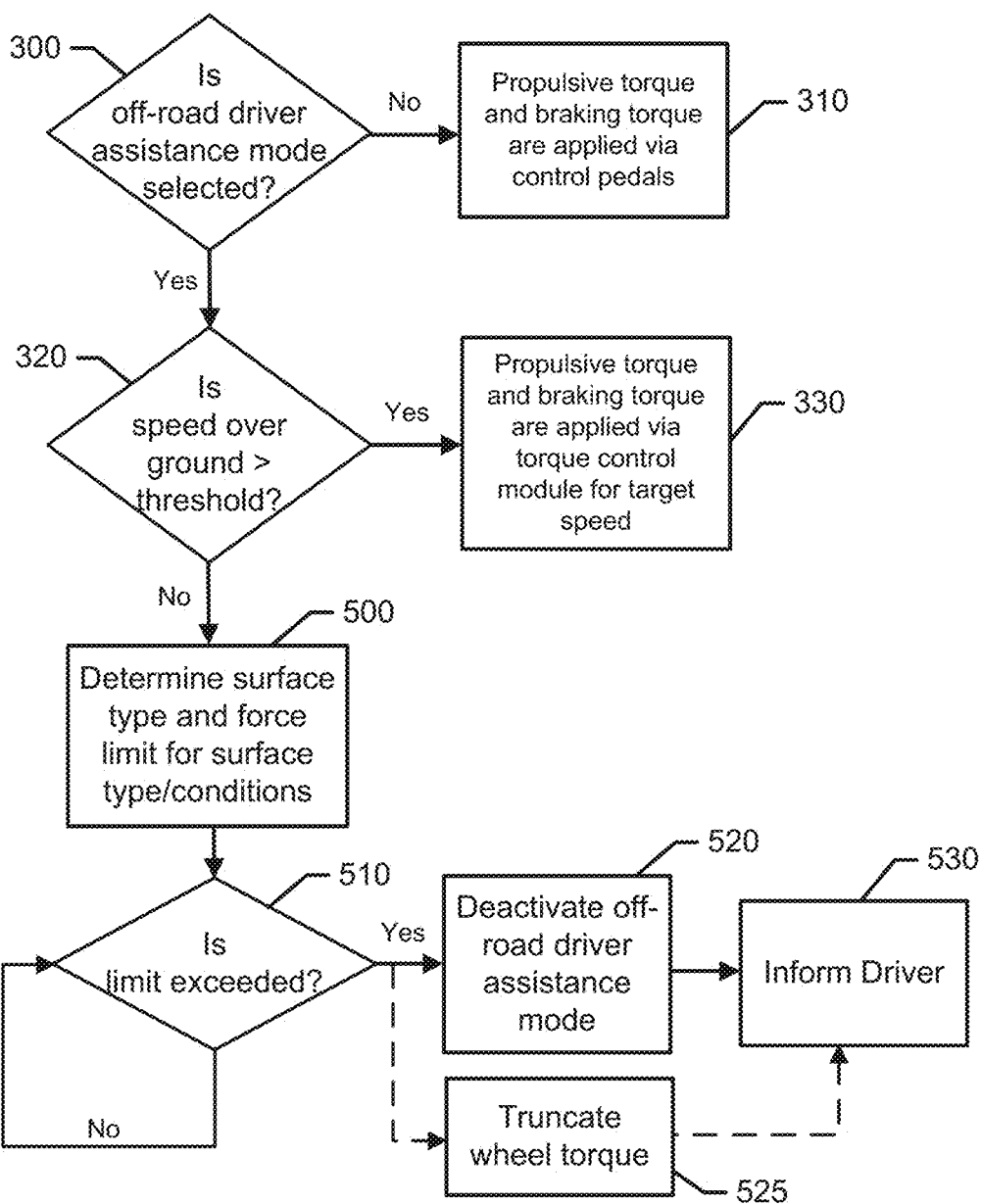
FIG. 5 illustrates another modified example of the control algorithm of FIG. 3 in accordance with an example embodiment.

FIG. 5 illustrates another alternative in which operations 300 to 330 are again similar to that of FIG. 3. However, if speed is slowing to below the threshold speed at operation 320, then a determination may be made as to what the surface type is and the force limit for the correspondingly determined surface type and/or condition at operation 500. Operation 510 may further include a determination as to whether the force limit is exceeded. If not, flow may continue to loop back to operation 510, but if the force limit is exceeded at operation 510, then the off-road driver assistance mode may be deactivated at operation 520. Alternatively, at operation 525, wheel torque may be truncated to ensure that wheel torque does not exceed the force limit at operation 525. In either case, the driver may be informed accordingly at operation 530. Notably, the method of FIG. 5 includes an initial check of speed, but the speed check could be skipped. In such an example, anytime the mode selector was in the off-road driver assistance mode, surface type/condition determinations may be made at operation 500 and the steps thereafter may be performed as shown in FIG. 5.

Figure 6:
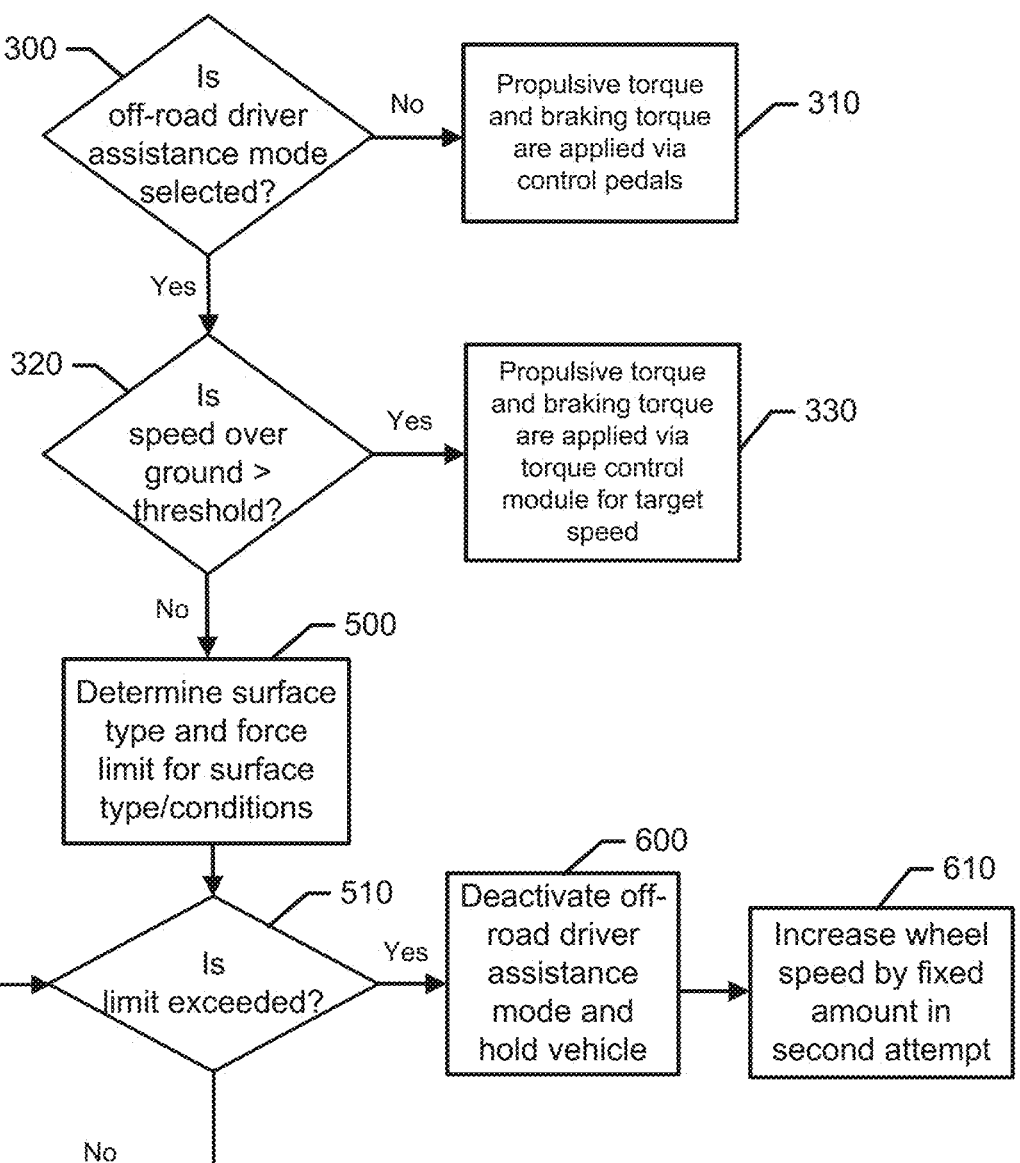
FIG. 6 illustrates yet another modified example of the control algorithm of FIG. 3 in accordance with an example embodiment.
Figure 7:
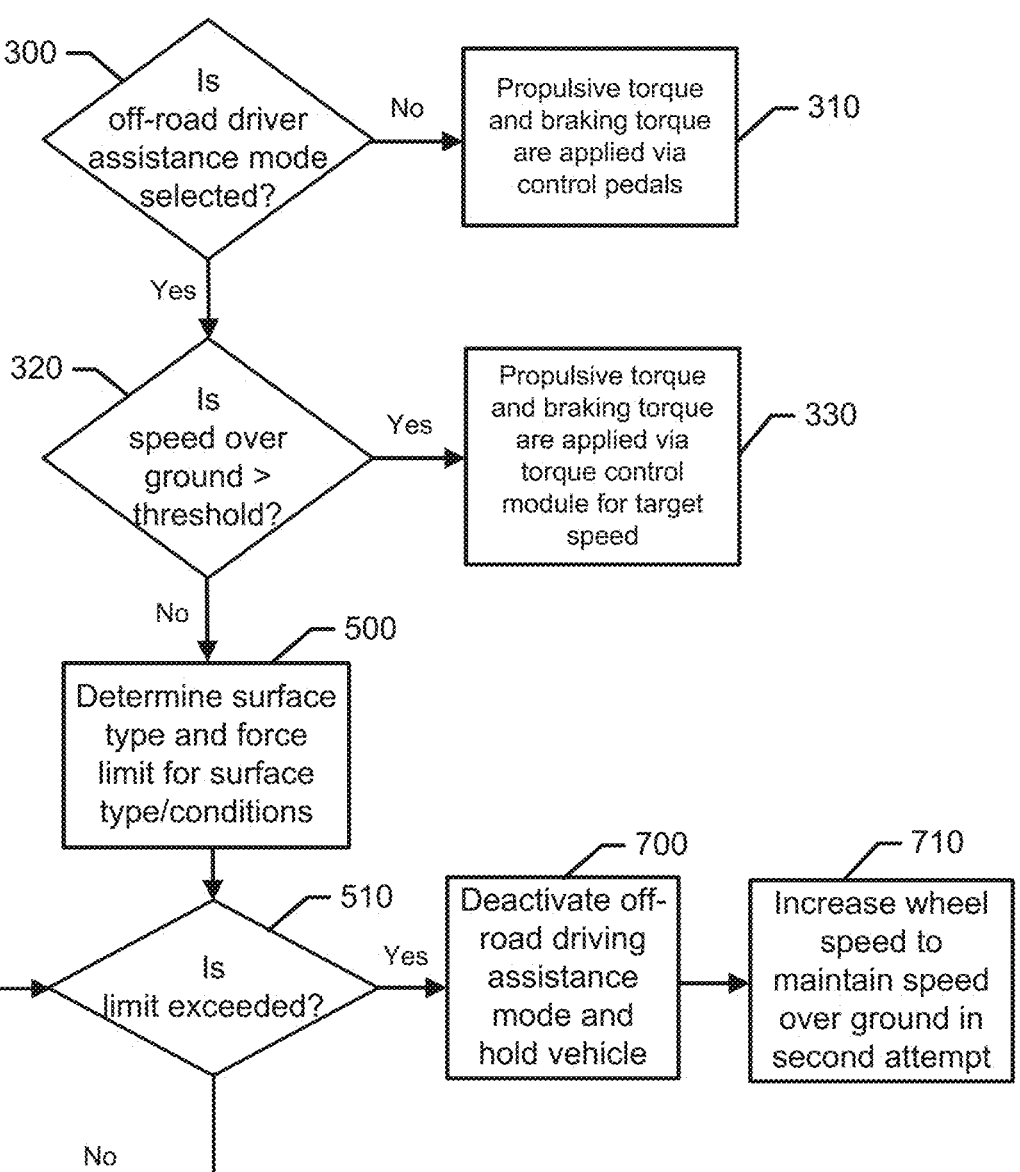
FIG. 7 illustrates still another modified example of the control algorithm of FIG. 3 in accordance with an example embodiment.

FIG. 6 illustrates a slight modification of the example of FIG. 5 in which if the force limit is exceeded at operation 510, the off-road driver assistance mode may be deactivated and the vehicle may initially be held at operation 600. Thereafter, wheel speed may be increased by a fixed amount in a second attempt to traverse the obstacle or ground to maintain forward speed over ground in the attempt. FIG. 7 shows still another example in which if the force limit is exceeded at operation 510, the off-road driver assistance mode may be deactivated and the vehicle may initially be held at operation 700. However, thereafter at operation 710, wheel speed is increased as needed to maintain a desired speed over ground during the second attempt. Still other modifications to these examples are also possible.

FIG. 8 illustrates a block diagram of one example method of providing automated control of vehicle speed in a driver assist mode (e.g., an off-road driver assist mode) aimed at selective or automatic monitoring of the mode while operational. The method may include receiving an indication of selection of an off-road driving assistance mode that controls a torque control module with respect to propulsive torque and braking torque application to achieve a target speed when the off-road driving assistance mode is selected at operation 800. The method may further include receiving tractive information from a sensor network operably coupled to components of the vehicle at operation 810, and modifying operation of the torque control module responsive to the tractive information indicating a trigger event at operation 820. In some cases, the method may include additional optional operations that are shown in dashed lines in FIG. 8. In this regard, for example, the method may further include determining a surface type on which the vehicle is operating at operation 815 and/or providing a notification to an operator of the vehicle to take manual control of brake torque application and/or propulsive torque application at operation 830.

Example embodiments may therefore also include a vehicle control system. The system may include a mode selector for enabling selection of an operating mode of the vehicle among a plurality of selectable operating modes, where at least one of the selectable operating modes includes an off-road driving assistance mode that controls propulsive torque and braking torque application when the off-road driving assistance mode is active. The system may further include a torque control module to generate both a propulsive torque request and a braking torque request based on a target speed set in association with the off-road driving assistance mode, a sensor network operably coupled to components of the vehicle to obtain tractive information associated with an operating context of the vehicle, and a controller operably coupled to the sensor network to receive the tractive information and modify operation of the torque control module responsive to the tractive information indicating a trigger event.

The system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the tractive information may include vehicle speed over ground, and the trigger event may include the vehicle speed over ground being below a threshold speed. In an example embodiment, the controller may use the tractive information to determine a surface type on which the vehicle is operating, and the trigger event may include determining that the propulsive torque request is greater than an estimated maximum tractive force for the determined surface type. In some cases, determining the surface type may include employing a camera to determine the surface type. In an example embodiment, determining the surface type may further include employing the camera to evaluate a tread pattern left in a surface traversed by a wheel of the vehicle. In some cases, the estimated maximum tractive force may be determined via a machine learning module employing a different model for determining tractive force limits for a given vehicle configuration for each respective different surface type. In an example embodiment, the tractive information may include vehicle speed over ground and ride height information, and the trigger event may include the vehicle speed over ground being below a threshold speed when the ride height information indicates a droop condition. In some cases, the modification to the torque control module may include deactivating the off-road driving assistance mode. In an example embodiment, the modification to the torque control module may include applying a limit to the propulsive torque request. In some cases, applying the limit to the propulsive torque request may include truncating wheel torque applied to one or more wheels based on a maximum allowed torque for a surface type determined based on the tractive information. In an example embodiment, the controller may provide a notification to an operator of the vehicle to take manual control of brake torque application and/or propulsive torque application. In some cases, the modification to the torque control module may include selectively applying propulsive torque to one axle or wheel determined to have tractive capability and not applying propulsive torque to another axle or wheel determined to lack tractive capability. In an example embodiment, the modification to the torque control module may include stopping the vehicle after a first attempt to traverse a point at which tractive capability was lost and defining an increased wheel speed for a second attempt to traverse the point. In some cases, the tractive information may include vehicle speed over ground and wheel speed, and the trigger event may include the vehicle speed over ground decreasing while wheel speed is constant. In an example embodiment, the modification to the torque control module may include increasing wheel speed to maintain the vehicle speed over ground constant.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:
1. A vehicle control system comprising:
    a mode selector for enabling selection of an operating mode of the vehicle among a plurality of selectable operating modes, at least one of the selectable operating modes comprising an off-road driving assistance mode that controls propulsive torque and braking torque application when the off-road driving assistance mode is active;

a torque control module to generate both a propulsive torque request and a braking torque request based on a target speed set in association with the off-road driving assistance mode;

a sensor network operably coupled to components of the vehicle to obtain tractive information associated with an operating context of the vehicle; and a controller operably coupled to the sensor network to receive the tractive information and modify operation of the torque control module responsive to the tractive information indicating a trigger event, wherein the controller provides a notification to an operator of the vehicle to take manual control of brake torque application and/or propulsive torque application, and wherein the modification to the torque control module comprises stopping the vehicle after a first attempt to traverse a point at which tractive capability was lost and defining an increased wheel speed for a second attempt to traverse the point.

2. The system of claim 1, wherein the tractive information comprises vehicle speed over ground, and wherein the trigger event comprises the vehicle speed over ground being below a threshold speed.

3. The system of claim 1, wherein the controller uses the tractive information to determine a surface type on which the vehicle is operating, and wherein the trigger event comprises determining that the propulsive torque request is greater than an estimated maximum tractive force for the determined surface type.

4. The system of claim 3, wherein the determining the surface type comprises employing a camera to determine the surface type.

5. The system of claim 4, wherein the determining the surface type further comprises employing the camera to evaluate a tread pattern left in a surface traversed by a wheel of the vehicle.

6. The system of claim 3, wherein the estimated maximum tractive force is determined via a machine learning module employing a different model for determining tractive force limits for a given vehicle configuration for each respective different surface type.

7. The system of claim 1, wherein the tractive information comprises vehicle speed over ground and ride height information, and wherein the trigger event comprises the vehicle speed over ground being below a threshold speed responsive to the ride height information indicating a droop condition.

8. The system of claim 1, wherein the modification to the torque control module comprises applying a limit to the propulsive torque request.

9. The system of claim 8, wherein applying the limit to the propulsive torque request comprises truncating wheel torque applied to one or more wheels based on a maximum allowed torque for a surface type determined based on the tractive information.

10. The system of claim 1, wherein the modification to the torque control module comprises selectively applying propulsive torque to one axle or wheel determined to have tractive capability and not applying propulsive torque to another axle or wheel determined to lack tractive capability.

11. The system of claim 1, wherein the tractive information comprises vehicle speed over ground and wheel speed, and wherein the trigger event comprises the vehicle speed over ground decreasing while wheel speed is constant.

12. The system of claim 11, wherein the modification to the torque control module comprises increasing wheel speed to maintain the vehicle speed over ground constant.

13. A vehicle control system comprising:

a mode selector for enabling selection of an operating mode of the vehicle among a plurality of selectable operating modes, at least one of the selectable operating modes comprising an off-road driving assistance mode that controls propulsive torque and braking torque application when the off-road driving assistance mode is active;

a torque control module to generate both a propulsive torque request and a braking torque request based on a target speed set in association with the off-road driving assistance mode;

a sensor network operably coupled to components of the vehicle to obtain tractive information associated with an operating context of the vehicle; and a controller operably coupled to the sensor network to receive the tractive information and modify operation of the torque control module responsive to the tractive information indicating a trigger event, wherein the tractive information comprises vehicle speed over ground and ride height information, and wherein the trigger event comprises the vehicle speed over ground being below a threshold speed responsive to the ride height information indicating a droop condition.

14. A method of providing automated control of an off-road driver assist mode, the method comprising:

receiving an indication of selection of an off-road driving assistance mode that controls a torque control module with respect to propulsive torque and braking torque application to achieve a target speed when the off-road driving assistance mode is selected;

receiving tractive information from a sensor network operably coupled to components of the vehicle; and modifying operation of the torque control module responsive to the tractive information indicating a trigger event, wherein the method further comprises determining a surface type on which the vehicle is operating, wherein the trigger event comprises determining that the propulsive torque request is greater than an estimated maximum tractive force for the determined surface type, and wherein the determining the surface type further comprises employing the camera to evaluate a tread pattern left in a surface traversed by a wheel of the vehicle.

15. The method of claim 14, wherein modifying the operation of the torque control module comprises deactivating the off-road driving assistance mode or applying a limit to the propulsive torque request.

16. The method of claim 14, wherein the tractive information comprises vehicle speed over ground, and wherein the trigger event comprises the vehicle speed over ground being below a threshold speed.

* * * * *